United States Patent [19]

Brown et al.

[11] Patent Number: 5,732,104
[45] Date of Patent: Mar. 24, 1998

[54] SIGNALLING TECHNIQUES AND DEVICE FOR HIGH SPEED DATA TRANSMISSION OVER VOICEBAND CHANNELS

[75] Inventors: William Leslie Brown, Mississauga, Canada; John L. Moran III, Millville; Manickam R. Sridhar, Holliston, both of Mass.

[73] Assignee: Motorola, Inc., Schaumburg, Ill.

[21] Appl. No.: 355,939

[22] Filed: Dec. 14, 1994

[51] Int. Cl.$^6$ ................................. H04B 1/38
[52] U.S. Cl. ................. 375/222; 375/377; 379/93; 379/97; 379/98
[58] Field of Search ..................... 375/219, 223, 375/377; 370/31, 84, 110.1, 110.2, 110.3, 111, 282, 295, 296, 465, 522, 525, 526, 528; 379/93, 97, 98

[56] References Cited

U.S. PATENT DOCUMENTS 5,317,594  5/1994  Goldstein ..................... 375/222
5,349,635  9/1994  Scott .......................... 379/97
5,353,280  10/1994  Ungerbock .................. 370/32.1
5,528,679  6/1996  Taarud ........................ 379/34

*Primary Examiner*—Stephen Chin
*Assistant Examiner*—Amanda T. Le
*Attorney, Agent, or Firm*—Darleen J. Stockley

[57] ABSTRACT

The present method (200,300, 400) and device (500, 600, 700) modify phase two of the format set forth in the V.34 Recommendation of the International Telecommunication Union-Telecommunication Standardization Sector to prevent premature disconnection of calls between a call modem and an answer modem. The method and device efficiently ensure connection of the call for high speed data transmission over voiceband channels, by modification of one of: a phase preliminary to phase one and phase two. One implementation, in the answer modem, includes transmitting a signal having first information, followed by a Signal S comprising of aguard tone and a signal S1, wherein an energy of a predetermined guard tone is greater than an energy of a predetermined range of frequencies of the Signal S1; and continuing transmitting and receiving in accordance with the modified V.34 operation.

28 Claims, 5 Drawing Sheets

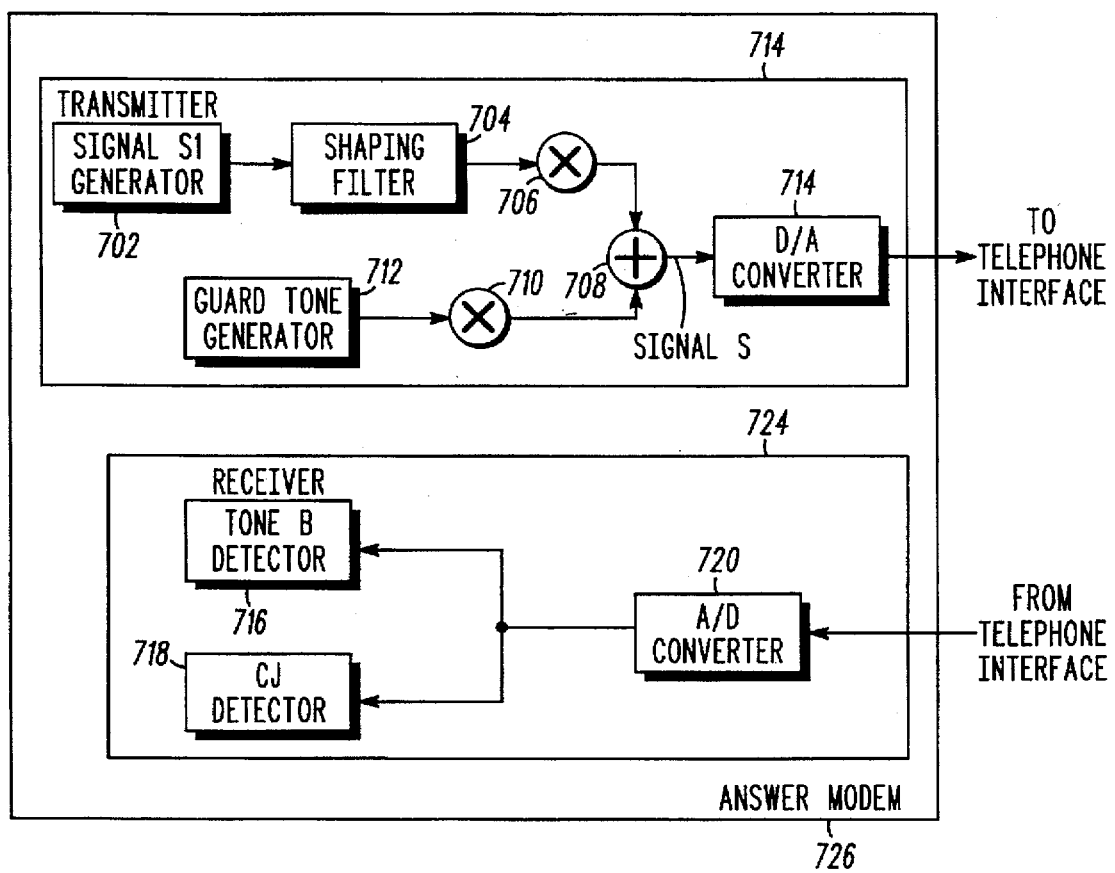

SIGNALLING TECHNIQUES AND DEVICE FOR HIGH SPEED DATA TRANSMISSION OVER VOICEBAND CHANNELS

FIELD OF THE INVENTION

The present invention relates generally to high speed data transmission, and more particularly to signalling techniques for high speed data transmission.

BACKGROUND

In general, analog data transmission services offer narrowband, wideband, and voiceband grades of transmission. The data transmission rates for each grade of service depends upon the bandwidth and electrical properties of each type of circuit offered within each grade of service. Data transmission is basically a function of the bandwidth of the communications line. That is, the greater the bandwidth, the higher the possible speed of transmission.

Narrowband facilities such as teletype terminals typically transmit in the range of 45 and 300 bps. For narrowband transmission, a voiceband is typically subdivided or a number of transmissions from different users are pooled onto a single portion of a circuit according to a predetermined time allocation, typically a bandwidth in the range of 200–400 Hz.

Wideband facilities typically are available only on leased lines and provide the highest transmission rates. However, transmission using the wide bandwidth is expensive.

Voiceband facilities utilize transmission via switched dial-up or leased lines. High speed transmission of data over switched dial-up, i.e., telephone lines, is available at a lower cost than transmission over leased voiceband lines.

Thus, today voiceband transmission is the most cost-effective medium for high speed data transmission. For high speed data transmission over voiceband channels, first a call has to be established. To enable call establishment, one of the standardized signalling systems, "Signalling System No. 5", has been set forth by the International Telecommunications Union-Telecommunication Sector (ITU-T). A V.34 Recommendation describes a procedure for establishing connection between a call modem and an answer modem over a voiceband channel. When a call sent by a call modem is received over a voiceband channel using Signalling System No. 5, in phase two of the V.34 Recommendation, an answer modem transmits signal A, having an 1800 Hz guard tone (GT) and a 2400 Hz tone A with transitions where $\overline{A}$ and a represent 180 degree phase reversals in the 2400 Hz tone only. In accordance with the V.34 Recommendation, Tone A is transmitted at 1 decibel (dB) below a nominal transmit power and the GT is transmitted at 7 dB below the nominal transmit power. However, sometimes a network embodying the Signalling System No. 5, upon receiving Tone A and the GT, disconnects the call. Thus, the standard set forth for Signalling System No. 5 lacks a definitive mechanism for efficiently ensuring connection of a call modem and an answer modem for high speed data transmission over voiceband channels using the V.34 Recommendation.

Thus, there is a need for providing a method and device for efficiently ensuring connection between a call modem and an answer modem for high speed data transmission in calls over voiceband channels.

BRIEF DESCRIPTION OF THE DRAWINGS

FIG. 6 is a flow chart of an embodiment of steps in accordance with the method of the present invention wherein phase two of the V.34 Recommendation is modified.

FIG. 7 is a block diagram of an embodiment of a device in answer modem that operates in accordance with the present invention.

DETAILED DESCRIPTION OF THE PREFERRED EMBODIMENTS

Signalling System No. 5 is one of the Recommendations set forth by the International Telecommunications Union-Telecommunication Sector (ITU-T) as a standard system for enabling calls to be established between a call modem and an answer modem. Since, especially for international calls, utilizing Signalling System No. 5, in the format set forth in the International Telecommunication Union-Telecommunication Standardization Sector V.34 Recommendation, approved Sep. 20, 1994, and incorporated herein by reference, frequently resulted in disconnection, the present invention was developed to avoid premature disconnection. Herein all references to said V.34 Recommendation are denoted "V.34". In addition, the signals for the V.34 Recommendation are incorporated herein by reference.

Figure 1:
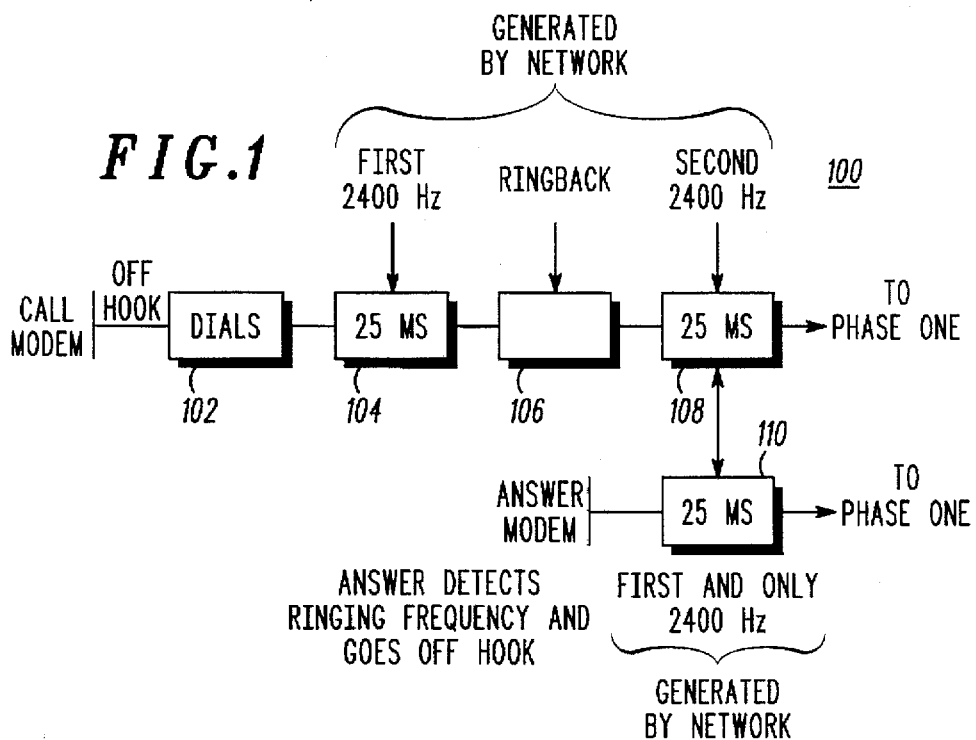
FIG. 1 is a diagram showing the progression of signalling for a call to establish a connection through a network between a call modem and an answer modem in accordance with the present invention.

FIG. 1, numeral 100, is a diagram of the progression of signalling for a call to establish a connection through a network between a call modem and an answer modem in accordance with the present invention. The following steps describe the sequence in which the call progresses through the network in accordance with the present invention. When a call modem goes off hook and dials (102), a first 2400 Hz tone is generated by the network (104) for approximately 25 ms, a ringback is generated by the network (106), and a second 2400 Hz tone is generated by the network (108, 110) for approximately 25 ms after the remote end goes off hook (on line) in response to the ringing frequency generated by the Network.

Figure 2:
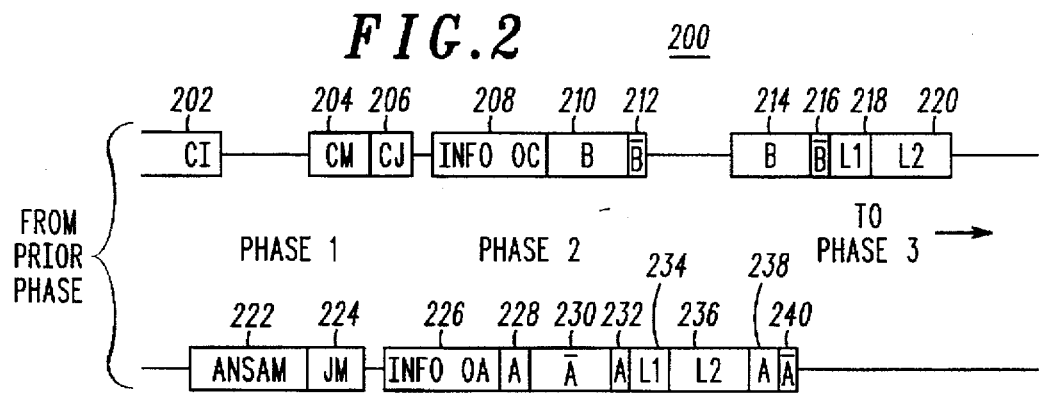
FIG. 2 is a diagram of a phase one and phase two progression of signalling to establish a voiceband data connection through a network between a call modem and an answer modem in accordance with the V.34 Recommendation.

FIG. 2, numeral 200, is a diagram of a phase one and phase two progression of signalling for a call to establish a connection through a network between a call modem and an answer modem in accordance with the V.34 Recommendation. Upon detecting a ringing signal, the answer modem goes off hook, and after a predetermined period of silence, and sends ANSam (222) as defined in Recommendation V.8, therefore, Recommendation V.8, and Recommendation V.25 are hereby incorporated by reference. Upon receiving ANSam from the Answer modem, the call modem stops sending signal Cl and sends signal CM (204). Then the Answer modem detects CM and in response sends signal JM (224) to the call modem, the call modem then sends a CJ signal (206) to the Answer modem to terminate or end the Phase 1, followed by a predetermined period of silence.

The next portion of the call establishment procedure is phase two of the V.34 Recommendation. As shown in FIG. 2, in phase two the call and answer modem exchange information signals INFO 0c (208) and INFO 0a (226), followed by exchanging Tone B, $\bar{B}$ (210, 212) and Tone A, $\bar{A}$ (228, 232). When a call sent by a call modem is received over a voiceband channel using the standard for Signalling System No. 5, in phase two an answer modem transmits Signal A, comprising of a 2400 Hz tone (Tone A) and a 1800 Hz guard tone (GT) with transitions where A and $\bar{A}$ represent 180 degree phase reversals in the 2400 Hz tone only. In accordance with the V.34 Recommendation, Tone A is transmitted at 1 decibel (dB) below a nominal transmit power and the GT is transmitted at 7 dB below the nominal transmit power. The answer modem further sends signals L1 (234), L2 (236), and repeats Signal A, $\bar{A}$. (238, 240), where L1 and L2 are chirp signals as defined by V.34. The call modem repeats Tone B, $\bar{B}$ and sends L1 and L2. Sometimes, network switching equipment embodying Signalling System No. 5, upon receiving Tone A and the GT, falsely detects Tone A as a Loopback Request or a Disconnect Request and disconnects the call. Phase two of V.34 operation described in the V.34 Recommendation has been modified by the present invention to provide a method that avoids disconnection of a call between a call modem and an answer modem for high speed data transmission over voiceband channels in a network embodying Signalling System No. 5.

Figure 3:
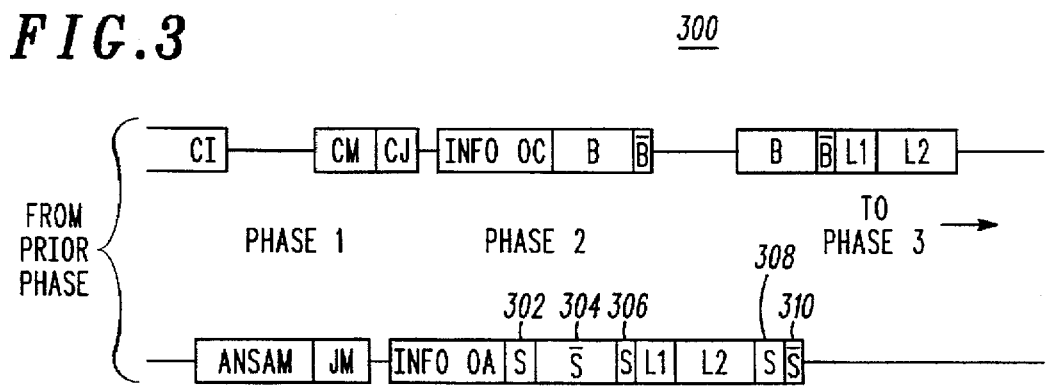
FIG. 3 is a diagram of a phase one and phase two progression of signalling to establish a voiceband data connection through a network between a call modem and an answer modem in accordance with the present invention.

FIG. 3, numeral 300, is a diagram of a phase one and phase two progression of signalling for a call to establish a connection through a network between a call modem and an answer modem in accordance with the present invention. In this modification of the phase one and phase two progression of signalling of V.34, Signal S, where Signal S may, for example, have a 1800 Hz guard tone (GT) and a 2400 Hz Signal $S_1$ with transitions between S and $\bar{S}$, where $\bar{S}$ has a 180 degree phase reversal from S, are substituted for Signal A and $\bar{A}$, respectively (302, 304, 306, 308, 310). Implementations of S are described in more detail below.

Figure 4:
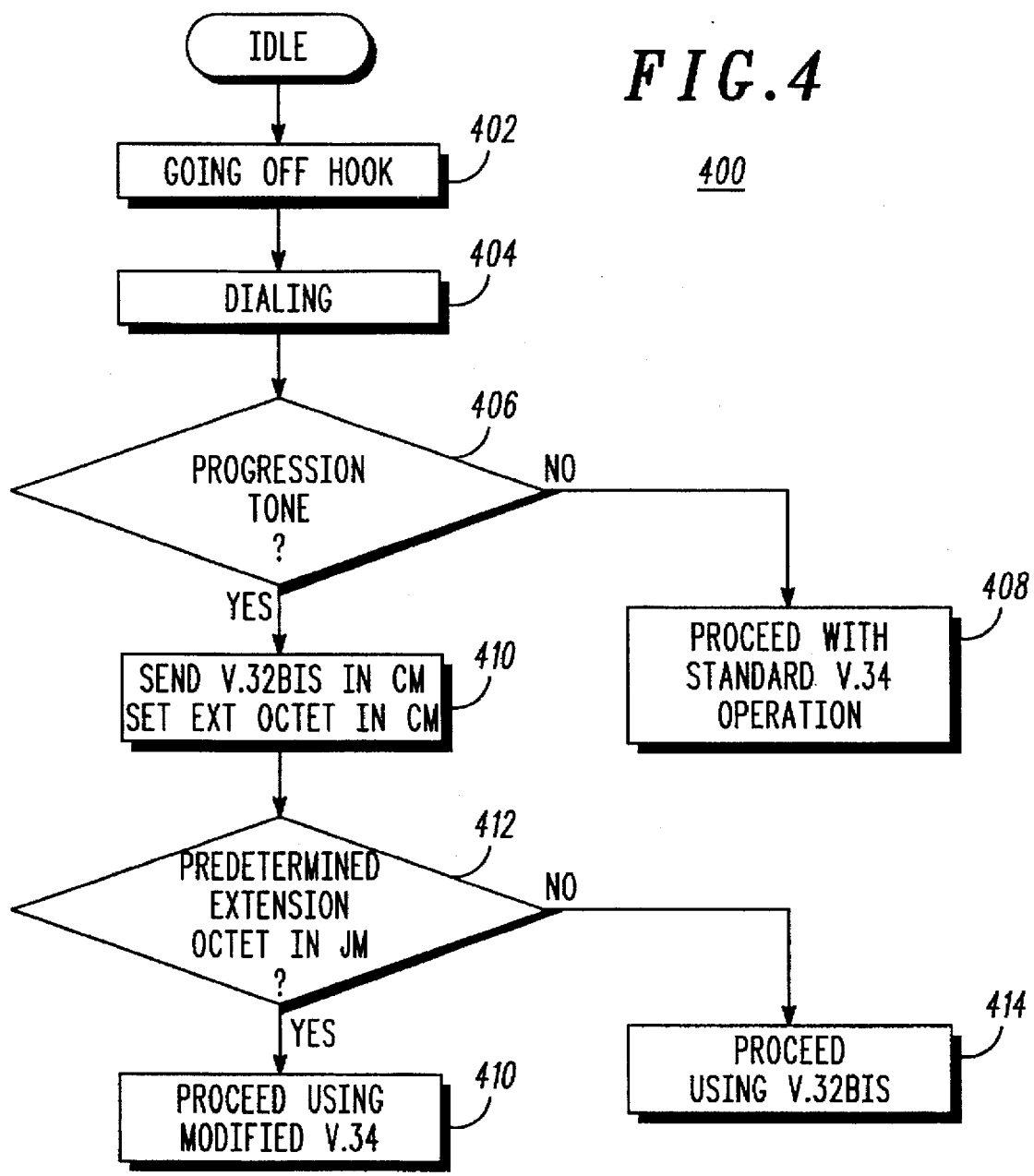
FIG. 4 is a flow chart of an embodiment of steps in accordance with the method of the present invention implemented in a call modem.

FIG. 4, numeral 400, is a flow chart of an embodiment of steps in accordance with the method of the present invention implemented in a call modem. When a call modem goes off hook (402) and dials (404), a progression tone, typically a 2400 Hz tone, is sent by a network. Where the progression tone is undetected by the call modem (406), the call modem proceeds with standard V.34 operation (408). Where the progression tone is detected by the call modem (406), the call modem sends a V.32 bis bit in CM and also sets an extension octet in CM (410), that indicates an operation mode. Where the call modem receives a predetermined extension octet set in JM (412), the call modem proceeds to operate using a modified V.34 operation as described herein (416; FIG. 3). Where the predetermined extension octet set in JM is undetected by the call modem (412), the call modem proceeds in accordance with V.32 bis.

Figure 5:
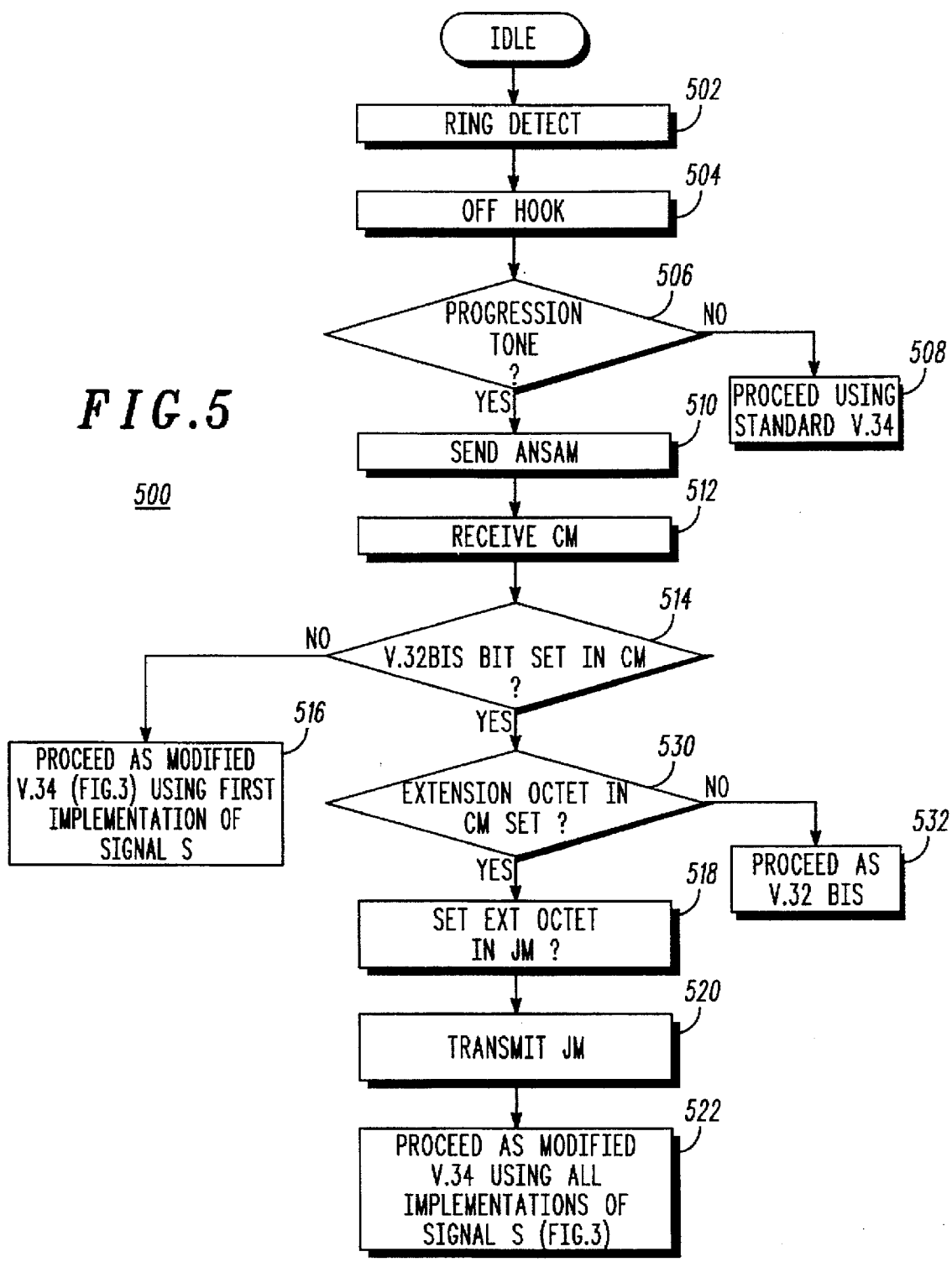
FIG. 5 is a flow chart of an embodiment of steps in accordance with the method of the present invention implemented in an answer modem.

FIG. 5, numeral 500, is a flow chart of an embodiment of steps in accordance with the method of the present invention implemented in an answer modem. Upon detecting a ring (502), the answer modem goes off hook (504). A progression tone, typically a 2400 Hz tone, is sent by a network of the communication system. Where the progression tone is undetected by the answer modem (506), the answer modem proceeds with standard V.34 operation (508). Where the progression tone is detected by the answer modem (506), the answer modem sends a predetermined answer signal, typically ANSam (510), receives a predetermined information signal CM (512) and determines whether a bit indicating V.32 bis operation is set in the predetermined information signal (514). Where the V.32 bis bit is unset (516), the answer modem proceeds to operate in accordance with the V.34 standard as modified herein (516; FIG. 3) using the first implementation of Signal S which is fully described later. Where the V.32 bis bit is set (530), the answer modem proceeds to determine if the extension octet in CM is set. If the extension octet is set (518), the answer modem sets an extension octet in JM (520), transmits JM (520), and proceeds in accordance with the V.34 standard as modified herein (522; FIG. 3) using any of the implementations of Signal S which are fully described later. If the extension octet is unset (532), the answer modem proceeds to operate as a V.32 bis .

FIG. 6, numeral 600, is a flow chart of an embodiment of steps in accordance with the method of the present invention wherein phase two of the V.34 Recommendation is modified. The invention includes a method for efficiently ensuring connection of a call between a call modem and an answer modem for high speed data transmission over voiceband channels in a network, comprising the steps of: where phase one has been completed in accordance with a V.34 Recommendation, an International Telecommunications Union-Telecommunication Standardization Sector standard, modifying phase two of said standard in accordance with the steps of: in the answer modem: 1) transmitting a signal having first information, followed by a Signal S, wherein the energy of a predetermined guard tone (GT) is greater than an energy of a predetermined range of frequencies of the Signal $S_1$ (602); wherein Signal S is comprised of the combination of the guard tone (GT) and Signal $S_1$ and 2) continuing transmitting and receiving in accordance with V.34 operation as modified in step 1 (604). Step 1 may be implemented in a number of ways, as described below. This method, implemented efficiently ensures connection of a call between a call modem and an answer modem for high speed data transmission over voiceband channels.

FIG. 7, numeral 700, is a block diagram of an embodiment of a device in answer modem (726) that operates in accordance with the present invention. The transmitter (722) of the answer modem (726) includes a Signal $S_1$ generator (702), a shaping filter (704), a first gain adjuster (typically a multiplier) (706), a guard tone generator (712), a second gain adjuster (again, typically a multiplier) (710), a combiner (typically a summer) (708), and a D/A converter (714). The Signal $S_1$ generator (702) sends a predetermined Signal $S_1$ as described more fully below. The shaping filter (704), operably coupled to the Signal $S_1$ generator, provides shaping to Signal $S_1$. The output of the shaping filter (704) input into the first gain adjuster (706) and is adjusted in accordance with the selected implementation set forth below. The guard tone generator (712) sends a predetermined guard tone, as described more fully below, to a second gain adjuster (710), that adjusts the energy of the guard tone in accordance with the selected implementation set forth below. The combiner (708) combines the output of the first gain adjuster (706) and the second gain adjuster (710) and sends the combined output (Signal S) to a D/A converter (714), that sends an analog output to a telephone interface.

Where selected, the receiver (724) of the answer modem (726) includes a tone B detector (716), a CJ detector (718) and an A/D converter (720). Where a signal for a call is received from the telephone interface to the answer modem (726), the signal is input into the A/D converter (720), and the output of the A/D converter is sent to the tone B detector (716) and to the CJ detector (718), where the signal is handled in accordance with the format set forth below. This figure illustrates elements necessary to implement the invention. Other elements comprising a modem are known to those skilled in the art and thus are not further described herein.

Figure 8:
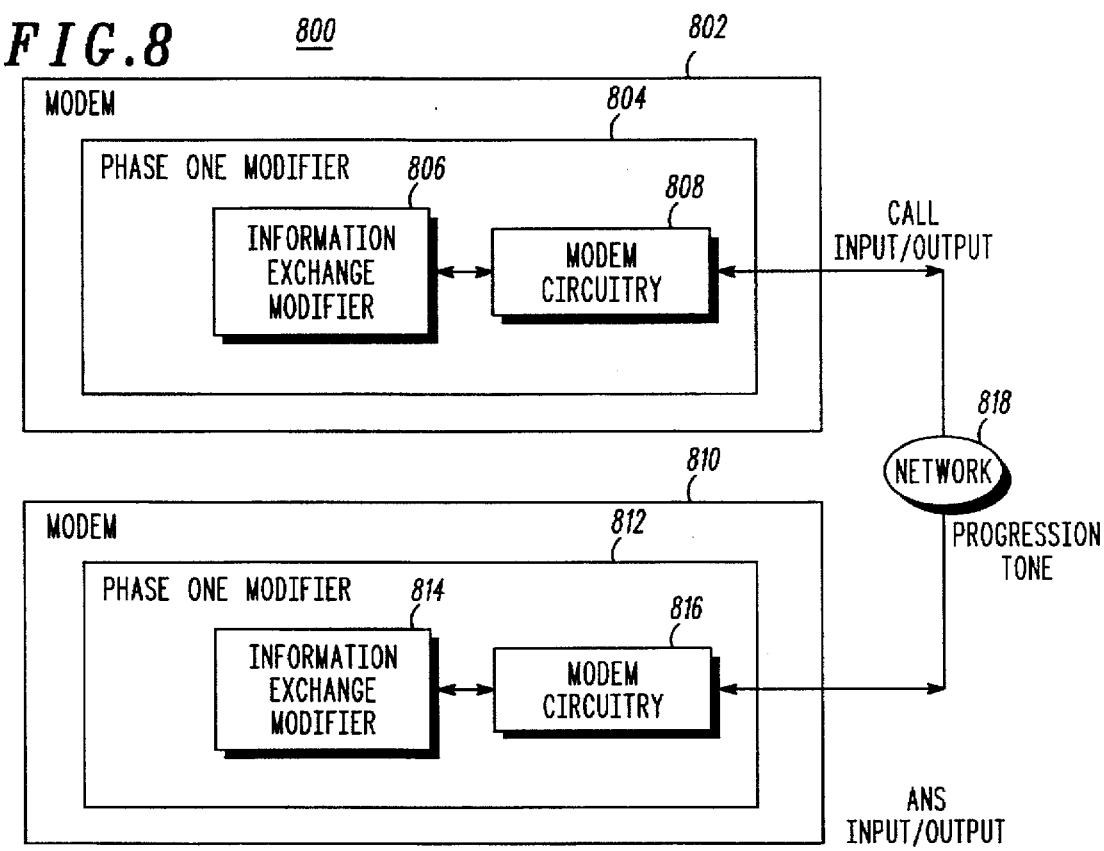
FIG. 8 is a block diagram of one embodiment of a device in a modem that operates in accordance with the present invention.

FIG. 8, numeral 800, is a block diagram of one embodiment of a device in a modem that operates in accordance with the present invention. The device efficiently ensures connection of a call between a call modem and an answer modem for high speed data transmission over voiceband channels in a network (818). In this embodiment, g the modems (802, 810) include phase one modifiers (804, 812) that include an information exchange modifier (806, 814) and modem circuitry (808,816). The phase one modifier (804, 812) in the call/answer modem, upon initiation of a call by the call modem and detection of a progression tone from the network (818) enables the information exchange modifiers. The information exchange modifier (806) provides, where the progression tone is detected, modification of first information exchanges between the call modem and the answer modem to convert modem operation to V.32 bis operation when a modem is nonresponsive to the progression tone and where the progression tone is undetected, proceeding with modem operation in accordance with said V.34 standard. The modem circuitry (808), operably coupled to the information exchange modifier provides continuing transmitting and receiving in accordance with standard V.32 bis, V.34 operation as modified (see FIG. 3).

Figure 9:
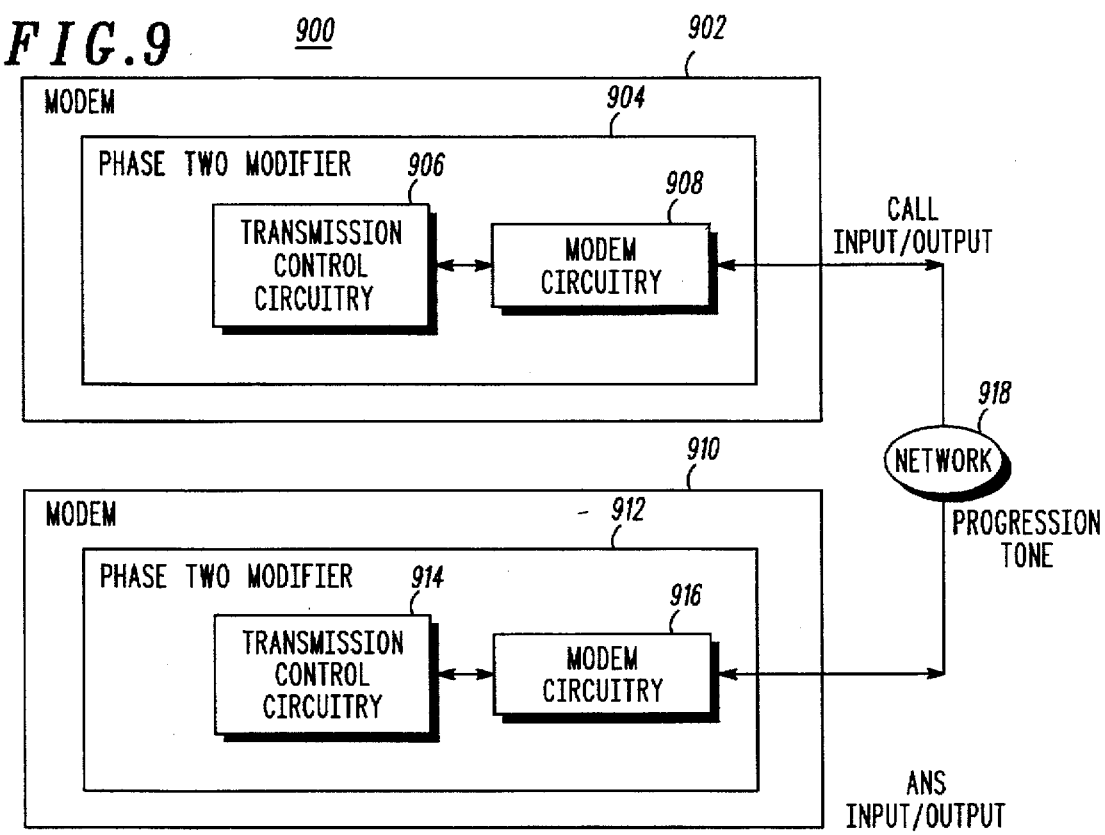
FIG. 9 is a block diagram of another embodiment of a device in a modem that operates in accordance with the present invention.

FIG. 9, numeral 900, is a block diagram of another embodiment of a device in a modem that operates in accordance with the present invention. The device efficiently ensures connection of a call between a call modem and an answer modem for high speed data transmission over voiceband channels in a network (918) for facilitating communication. In this embodiment, the modem (902, 910) includes a phase two modifier (904, 912) that includes transmission control circuitry (906, 914), and modem circuitry (908, 916). The device provides the phase two modifier in the answer modem, where phase one has been completed in accordance with a V.34 Recommendation, an International Telecommunications Union-Telecommunication Standardization Sector standard. The transmission control circuitry (906, 914) provides transmission of a signal having first information, followed by a guard tone and a Signal $S_1$, wherein the energy of a guard tone is greater than an energy of a predetermined range of frequencies of the Signal $S_1$. The modem circuitry (908, 916), operably coupled to the transmission control circuitry, provides continuing transmitting and receiving in accordance with V.34 operation as modified (see FIG. 3). The following paragraphs describe the various implementations for Signal S.

In a first implementation where the energy of the guard tone is greater than an energy of a predetermined range of frequencies of Signal $S_1$, the guard tone is an 1800 Hz tone that is transmitted at 1 decibel below a nominal transmit power and Signal $S_1$ is a 2400 Hz tone transmitted at 7 decibels below a nominal transmit power and having transitions between S and $\overline{S}$, and similarly between $\overline{S}$ and S, that are 180 degree phase reversals of Signal $S_1$ only. An advantage of this implementation is that this gain-scaling modification may be accomplished in the answer modem without modifying the call modem also.

In a second implementation the guard tone is an 1800 Hz tone transmitted at 3 decibels below a nominal transmit power and Signal $S_1$ comprising three frequencies: 2100 Hz, 2400 Hz, and 2700 Hz transmitted at 3 decibels below a nominal transmit power and Signal S has transitions between S and $\overline{S}$, and similarly between $\overline{S}$ and S, that are 180 degree phase reversals of $S_1$ only. This implementation also has the advantage that only the answer modem is modified.

In a third implementation the guard tone is an 1800 Hz tone that is transmitted at 7 decibels below a nominal transmit power and Signal $S_1$ is a 2500 Hz tone that is transmitted at 1 decibel below a nominal transmit power, where Signal S has transitions between S and $\overline{S}$, and similarly between $\overline{S}$ and S, that are 180 degree phase reversals of Signal $S_1$ only. In this implementation, both the call modem and the answer modem must be modified.

In a fourth implementation in phase two the V.34 operation of the International Telecommunications Union-Telecommunication Standardization Sector standard is modified to provide an adjusted call modem that recognizes an 1800 Hz Tone D in place of Tone A for performing ranging and signaling to terminate probing and in the answer modem step A includes; (1) transmitting a signal having first information, followed by an 1800 Hz Tone D at 1 decibel below a nominal transmit power, where Tone D has transitions between D and $\overline{D}$, and similarly between $\overline{D}$ and D, that are 180 degree phase reversals, where Tone D is used to perform ranging and signaling to terminate probing; (2) during INFO 0A and INFO 1A sequences of V.34 operation, utilizing the 1800 Hz Tone D as a guard tone at 3 decibels below a nominal transmit power, where INFO 0A and INFO 1A sequences are transmitted using a 2400 Hz carrier at 3 decibels below the nominal transmit power; and (3) continuing transmitting and receiving in accordance with V.34 operation as set forth in the International Telecommunications Union-Telecommunication Standardization Sector standard and modified herein.

In a fifth implementation the following steps are utilized: (1) Signal $S_1$ is a 2500 Hz tone transmitted at 3 decibels below a nominal transmit power and having transitions between S and $\overline{S}$, and similarly between $\overline{S}$ and S, that are 180 degree phase reversals of Signal $S_1$ only; and (2) the guard tone is an 1800 Hz tone that is transmitted at 3 decibels below a nominal transmit power.

In a sixth implementation the following steps are utilized: (1) Signal $S_1$ is a signal comprising three frequencies: 2200 Hz, 2500 Hz, and 2800 Hz, transmitted at 3 decibels below a nominal transmit power and having transitions between S and $\overline{S}$, and similarly between $\overline{S}$ and S, that are 180 degree phase reversals of Signal $S_1$ only; and (2) the guard tone is an 1800 Hz tone that is transmitted at 3 decibels below a nominal transmit power.

The present invention modifies one of the first two phases of the V.34 Recommendation to ensure connection between a call modem and an answer modem for high speed data transmission of calls over voiceband channels.

In the present invention the high speed data signal is typically transmitted over switched dial-up line(s). The switched dial-up line(s) generally include telephone line(s).

Typically, the nominal transmit power is the average power transmitted by the modem using the full transmission band.

The predetermined first tone is typically a 1200 Hz tone, Tone B, having transitions between B and $\overline{B}$, and similarly between $\overline{B}$ and B, that are 180 degree phase reversals in the first tone.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for establishing a connection by a call modem to an answer modem in a communication network, the call modem having a standard first modulation mode, a modified first modulation mode, and a standard second modulation mode, the call modem having a configured modulation mode equal to one of the standard first modulation mode and the standard second modulation mode, the method comprising the steps of:

initiating a call;

determining whether a progression tone generated by the communication network is present;

formatting a first message for transmission to the answer modem, wherein the step of formatting comprises:

setting a requested modulation mode indicator in the first message to indicate one of the standard first modulation mode and the standard second modulation mode;

determining whether a progression tone detected indicator should be included in the first message; and including the progression tone detected indicator in the first message if the determination is made to include the progression tone detected indicator; and transmitting the first message to the answer modem.

2. The method of claim 1 wherein the step of formatting the first message comprises the steps of:

setting the requested modulation mode indicator to indicate the standard first modulation mode and determining that the progression tone detected indicator should be excluded from the first message, if the configured modulation mode is equal to the first modulation mode and the progression tone is determined to be absent;

setting the requested modulation mode indicator to indicate the standard second modulation mode and determining that the progression tone detected indicator should be included in the first message, if the configured modulation mode is equal to the first modulation mode and the progression tone is determined to be present; and setting the requested modulation mode indicator to indicate the standard second modulation mode and determining that the progression tone detected indicator should be excluded from the first message, if the configured modulation mode is equal to the second modulation mode.

3. The method of claim 1 wherein:

the standard first modulation mode is V.34; and the standard second modulation mode is one of:

V.32 bis;

V.32;

V.22 bis; and

V.22.

4. The method of claim 1 wherein the progression tone is a 2400 Hz tone.

5. The method of claim 1 further comprising the steps of:

receiving a second message from the answer modem, said second message containing a selected modulation mode indicator;

determining whether an extension octet is present in the second message;

where the extension octet is determined to be absent from the second message, proceeding according to the selected modulation mode indicator; and where the extension octet is determined to be present in the second message, proceeding according to the modified first modulation mode.

6. The method of claim 5 wherein:

the standard first modulation mode utilizes a standard ranging tone having a first frequency and transmitted at a first transmit power level and further utilizes a standard guard tone having a second frequency and transmitted at a second transmit power level, the second transmit power level being less than the first transmit power level; and wherein:

the modified first modulation mode utilizes a modified ranging tone having a third frequency and transmitted at a third transmit power level and further utilizes a modified guard tone having a fourth frequency and transmitted at a fourth transmit power level, the third frequency being equal to the first frequency and the fourth transmit power level being greater than or equal to the third transmit power level.

7. The method of claim 5 wherein:

the standard first modulation mode utilizes a standard ranging tone having a first frequency and transmitted at a first transmit power level and further utilizes a standard guard tone having a second frequency and transmitted at a second transmit power level, the second transmit power level being less than the first transmit power level; and wherein:

the modified first modulation mode utilizes a modified ranging tone having a third frequency and transmitted at a third transmit power level and further utilizes a modified guard tone having a fourth frequency and transmitted at a fourth transmit power level, the third frequency being distinct from the first frequency.

8. A method for establishing a connection by an answer modem to a call modem in a communication network, the answer modem having a standard first modulation mode, a modified first modulation mode, and a standard second modulation mode, the answer modem having a configured modulation mode equal to one of the standard first modulation mode and the standard second modulation mode, the method comprising the steps of:

answering a call;

determining whether a progression tone generated by the communication network is present;

receiving from the call modem a first message containing a requested modulation mode indicator for indicating one of the standard first modulation mode and the standard second modulation mode;

determining whether a progression tone detected indicator is present in the first message; and selecting a modulation mode according to at least one of:

the configured modulation mode;

the requested modulation mode indicator;

the determination whether the progression tone is present; and the determination whether the progression tone detected indicator is present.

9. The method of claim 8 wherein the step of selecting a modulation mode comprises:

selecting the standard first modulation mode if the configured modulation mode is equal to the standard first modulation mode, the requested modulation mode indicator indicates the standard first modulation mode, and the progression tone is determined to be absent.

10. The method of claim 8 wherein the step of selecting a modulation mode comprises:

selecting the modified first modulation mode, if the configured modulation mode is equal to the standard first modulation mode, the requested modulation mode indicator indicates the standard first modulation mode, and the progression tone is determined to be present.

11. The method of claim 8 wherein the step of selecting a modulation mode comprises:

selecting the modified first modulation mode, if the configured modulation mode is equal to the standard first modulation mode, the requested modulation mode indicator indicates the standard second modulation mode, and the progression tone detected indicator is determined to be present in the first message.

12. The method of claim 8 wherein the step of selecting a modulation mode comprises:

selecting the standard second modulation mode, if one of:
the configured modulation mode is equal to the standard second modulation mode; and
the requested modulation mode indicator indicates the standard second modulation mode and the progression tone detected indicator is determined to be absent from the first message.

13. The method of claim 8 wherein:
the standard first modulation mode is V.34; and
the standard second modulation mode is one of:
V.32 bis;
V.32;
V.22 bis; and
V.22.

14. The method of claim 8 wherein the progression tone is a 2400 Hz tone.

15. The method of claim 8 further comprising the steps of:
formatting a second message for the call modem, wherein the step of formatting comprises:
setting a modulation mode indicator in the second message to indicate one of the standard first modulation mode and the standard second modulation mode;
determining whether an extension octet should be included in the second message; and
including the extension octet in the second message if the determination is made to include the extension octet; and
transmitting the second message to the call modem.

16. The method of claim 15 wherein, in the modified first modulation mode, where the configured modulation mode is equal to the standard first modulation mode, the requested modulation mode indicator indicates the standard first modulation mode, and the progression tone is determined to be present, the step of formatting the second message comprises the steps of:
setting the selected modulation mode indicator to indicate the standard first modulation mode; and
determining that the extension octet should be excluded from the second message.

17. The method of claim 16 wherein:
the standard first modulation mode utilizes a standard ranging tone having a first frequency and transmitted at a first transmit power level and further utilizes a standard guard tone having a second frequency and transmitted at a second transmit power level, the second transmit power level being less than the first transmit power level; and wherein:
the modified first modulation mode utilizes a modified ranging tone having a third frequency and transmitted at a third transmit power level and further utilizes a modified guard tone having a fourth frequency and transmitted at a fourth transmit power level, the third frequency being equal to the first frequency and the fourth transmit power level being greater than or equal to the third transmit power level.

18. The method of claim 15 wherein, in the modified first modulation mode, where the configured modulation mode is equal to the standard first modulation mode, the requested modulation mode indicator indicates the standard second modulation mode, and the progression tone detected indicator is present in the first message, the step of formatting the second message comprises the steps of:
setting the selected modulation mode indicator to indicate the standard first modulation mode; and
determining that the extension octet should be included in the second message.

19. The method of claim 18 wherein:
the standard first modulation mode utilizes a standard ranging tone having a first frequency and transmitted at a first transmit power level and further utilizes a standard guard tone having a second frequency and transmitted at a second transmit power level, the second transmit power level being less than the first transmit power level; and wherein:
the modified first modulation mode utilizes a modified ranging tone having a third frequency and transmitted at a third transmit power level and further utilizes a modified guard tone having a fourth frequency and transmitted at a fourth transmit power level, the third frequency being equal to the first frequency and the fourth transmit power level being greater than or equal to the third transmit power level.

20. The method of claim 18 wherein:
the standard first modulation mode utilizes a standard ranging tone having a first frequency and transmitted at a first transmit power level and further utilizes a standard guard tone having a second frequency and transmitted at a second transmit power level, the second transmit power level being less than the first transmit power level; and wherein:
the modified first modulation mode utilizes a modified ranging tone having a third frequency and transmitted at a third transmit power level and further utilizes a modified guard tone having a fourth frequency and transmitted at a fourth transmit power level, the third frequency being distinct from the first frequency.

21. A device for establishing a high speed data connection over voiceband channels in a communication network, the device supporting a standard first modulation mode and a standard second modulation mode, each modulation mode having a plurality of phases, each phase having at least one message transmitted by the device, each phase further having at least one message received by the device, the device comprising:
a first phase modifier for modifying a first phase of the standard first modulation mode, the first phase modifier comprising:
an information exchange modifier for modifying at least one message transmitted by the device during said first phase; and first modem circuitry, operably coupled to the information exchange modifier, for transmitting and receiving messages.

22. The device of claim 21 wherein, where the device has a configured modulation mode equal to one of the standard first modulation mode and the standard second modulation mode, the information exchange modifier comprises:

logic for determining whether a progression tone generated by the network is present; and logic for formatting a first message for transmission, said first message containing a requested modulation mode indicator for indicating one of the standard first modulation mode and the standard second modulation mode;

logic for determining whether a progression tone detected indicator should be included in the first message; and logic for including the progression tone detected indicator when the determination is made to include the progression tone indicator; wherein:

the requested modulation mode indicator is set to indicate the standard first modulation mode and the determination is made to exclude the progression tone detected indicator from the first message, if the configured modulation mode is equal to the first modulation mode and the progression tone is determined to be absent;

the requested modulation mode indicator is set to indicate the standard second modulation mode and the determination is made to include the progression tone detected indicator in the first message, if the configured modulation mode is equal to the first modulation mode and the progression tone is determined to be present; and the requested modulation mode indicator is set to indicate the standard second modulation mode and the determination is made to exclude the progression tone detected indicator from the first message, if the configured modulation mode is equal to the second modulation mode.

23. The device of claim 21 wherein, where the device has a configured modulation mode equal to one of the standard first modulation mode and the standard second modulation mode, the information exchange modifier comprises:

logic for determining whether a progression tone generated by the communication network is present;

logic for proceeding according to the configured modulation mode, if the progression tone is absent;

logic for receiving a first message containing a requested modulation mode indicator for indicating one of the standard first modulation mode and the standard second modulation mode;

logic for determining whether a progression tone detected indicator is present in the first message;

logic for formatting a second message for transmission, said second message containing a selected modulation mode indicator indicating one of the standard first modulation mode and the standard second modulation mode;

logic for determining whether an extension octet should be included in the second message; and logic for including the extension octet in the second message when the determination is made to include the extension octet; wherein:

the selected modulation mode indicator is set to indicate the standard first modulation mode and the determination is made to exclude the extension octet from the second message, if the configured modulation mode is equal to the standard first modulation mode and the requested modulation mode indicator indicates the standard first modulation mode;

the selected modulation mode indicator is set to indicate the standard first modulation mode and the determination is made to include the extension octet in the second message, if the configured modulation mode is equal to the standard first modulation mode, the requested modulation mode indicator indicates the standard second modulation mode, and the progression tone detected indicator is determined to be present in the first message; and the selected modulation mode indicator is set to indicate the standard second modulation mode and the determination is made to exclude the extension octet from the second message, if one of:

the configured modulation mode is equal to the standard second modulation mode; and the requested modulation mode indicator indicates the standard second modulation mode and the progression tone detected indicator is determined to be absent from the first message.

24. The device of claim 21 comprising:

a second phase modifier for modifying a second phase of the standard first modulation mode, the second phase modifier comprising:

transmission control circuitry for controlling the frequency and transmit power level for a ranging tone and a guard tone transmitted by the device during said second phase; and second modem circuitry, operably coupled to the transmission control circuitry, for transmitting the ranging tone and the guard tone.

25. The device of claim 24 wherein, where the ranging tone has a first selected frequency and a first selected transmit power level, the guard tone has a second selected frequency and a second selected transmit power level, and the network is responsive to the ranging tone and to the guard tone for disconnecting the connection when the first selected frequency is equal to a predetermined signaling frequency and the second selected transmit power level is less than the first predetermined transmit power level, the transmission control circuitry comprises:

logic for selecting the first frequency to be equal to the predetermined signaling frequency; and logic for selecting the first transmit power level and the second transmit power level such that the second transmit power level is greater than or equal to the first transmit power level.

26. The device of claim 24 wherein, where the ranging tone has a first selected frequency and a first selected transmit power level, the guard tone has a second selected frequency and a second selected transmit power level, and the network is responsive to the ranging tone and to the guard tone for disconnecting the connection when the first selected frequency is equal to a predetermined signaling frequency and the second selected transmit power level is less than the first predetermined transmit power level, the transmission control circuitry comprises:

logic for selecting the first frequency to be distinct from the predetermined signaling frequency.

27. In a device which establishes a connection over a communication network using a modulation mode, the modulation mode including logic for transmitting a ranging tone having a first frequency and a first transmit power level and a guard tone having a second frequency and a second transmit power level, the first frequency being equal to a predetermined signaling frequency, the first transmit power level being greater than the second transmit power level, the communication network responsive to the ranging tone and the guard tone for disconnecting the connection, a method for preventing disconnection by the communication network comprising the steps of:

modifying the modulation mode to transmit the ranging tone at a third transmit power level; and modifying the modulation mode to transmit the guard tone at a fourth transmit power level; wherein:

the third transmit power level is less than the fourth transmit power level.

28. The method of claim 27 wherein the communication network comprises Signaling System Number 5 and wherein the predetermined signaling frequency is equal to 2400 Hz.

* * * * *